US009420605B2

(12) United States Patent
Bontu et al.

(10) Patent No.: US 9,420,605 B2
(45) Date of Patent: Aug. 16, 2016

(54) METHOD AND APPARATUS FOR CELL COORDINATION IN HETEROGENEOUS CELLULAR NETWORKS

(71) Applicant: BlackBerry Limited, Waterloo (CA)

(72) Inventors: Chandra Sekhar Bontu, Nepean (CA); Yi Song, Plano, TX (US); Zhijun Cai, Euless, TX (US)

(73) Assignee: BlackBerry Limited, Waterloo, Ontario (CA)

( * ) Notice: Subject to any disclaimer, the term of this patent is extended or adjusted under 35 U.S.C. 154(b) by 469 days.

(21) Appl. No.: 13/891,939

(22) Filed: May 10, 2013

(65) Prior Publication Data
US 2014/0334439 A1    Nov. 13, 2014

(51) Int. Cl.
*H04W 36/00*    (2009.01)
*H04W 72/12*    (2009.01)

(52) U.S. Cl.
CPC ................................. *H04W 72/1289* (2013.01)

(58) Field of Classification Search
CPC ............................ H04W 72/023; H04W 24/10
USPC ......................................................... 370/331
See application file for complete search history.

(56) References Cited

U.S. PATENT DOCUMENTS

| 8,224,371 | B1 * | 7/2012 | Vargantwar | H04W 52/06 370/236 |
| 8,401,556 | B2 * | 3/2013 | Uehara | H04J 11/0086 455/434 |
| 8,755,324 | B2 * | 6/2014 | Yu | H04W 72/085 370/315 |
| 2008/0248800 | A1 | 10/2008 | Jalloul | |
| 2010/0103867 | A1 * | 4/2010 | Kishiyama | H04W 52/146 370/320 |
| 2011/0261769 | A1 * | 10/2011 | Ji | H04L 5/0007 370/329 |
| 2012/0115469 | A1 * | 5/2012 | Chen | H04W 36/0094 455/434 |
| 2012/0207044 | A1 * | 8/2012 | Johansson | H04W 24/10 370/252 |
| 2013/0107705 | A1 * | 5/2013 | Dinan | H04W 72/0446 370/230 |
| 2013/0107828 | A1 * | 5/2013 | Dinan | H04W 72/0446 370/329 |
| 2013/0203419 | A1 * | 8/2013 | Siomina | H04W 36/0083 455/437 |
| 2013/0229931 | A1 * | 9/2013 | Kim | H04W 24/10 370/252 |
| 2013/0235738 | A1 * | 9/2013 | Siomina | H04W 24/00 370/252 |
| 2013/0272170 | A1 * | 10/2013 | Chatterjee | H04W 28/02 370/280 |
| 2013/0301439 | A1 * | 11/2013 | Heo | H04W 76/048 370/252 |

(Continued)

FOREIGN PATENT DOCUMENTS
WO    2011130452 A2    10/2011
WO    2012060602 A2    5/2012

OTHER PUBLICATIONS
3GPP TS 36.300 V10.5.0 (Sep. 2011) Technical Specification: Evolved Universal Terrestrial Radio Access (E-UTRA) and Evolved Universal Terrestrial Radio Access Network (E-UTRAN); Overall description; Stage 2 (Release 10).

(Continued)

*Primary Examiner* — Curtis A Alia
*Assistant Examiner* — Emmanuel Maglo
(74) *Attorney, Agent, or Firm* — Fish & Richardson P.C.

(57) ABSTRACT

There is provided a method and apparatus for coordinating cells in a heterogeneous network. A serving cell determines scheduling parameters for scheduling a UE intermittently between a serving cell and at least one coordinating cell. The scheduling parameters define a cycle for the UE in which the UE alternates between listening to the serving cell and each of the coordinating cells. Timing offsets between the serving cell and the coordinating cells is determined by a UE and reported back to the eNB of the serving cell.

18 Claims, 11 Drawing Sheets

(56) References Cited

U.S. PATENT DOCUMENTS

2014/0051426 A1* 2/2014 Siomina ............ H04W 36/0088
455/422.1
2014/0321345 A1* 10/2014 Li ........................ H04W 52/143
370/311

OTHER PUBLICATIONS

3GPP TS 36.331 V10.3.0 (Sep. 2011) Technical Specification: Evolved Universal Terrestrial Radio Access (E-UTRA); Radio Resource Control (RRC); Protocol Specification (Release 10).

U.S. Appl. No. 13/856,224, filed Apr. 3, 2013, "Method and Apparatus for Efficient Handover in Heterogeneous Cellular Networks"; not yet published.

International Search Report and Written Opinion mailed Jan. 16, 2014; in corresponding PCT patent application No. PCT/US2013/049470.

English abstract for WO2012060602; published on May 10, 2013 and retrieved on Feb. 20, 2014.

* cited by examiner

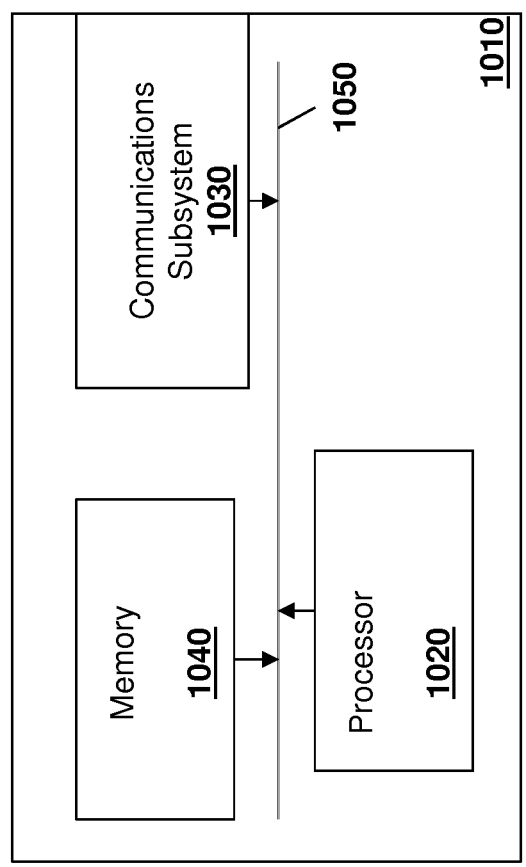

METHOD AND APPARATUS FOR CELL COORDINATION IN HETEROGENEOUS CELLULAR NETWORKS

FIELD OF THE DISCLOSURE

The present disclosure relates to heterogeneous cellular networks and in particular relates to a method of cell coordination in heterogeneous cellular networks.

BACKGROUND

A clustered cell deployment where a large number of low-power cells (deployed in an unplanned manner) within a macro cell coverage is considered. Pico cells and femto or small cell clusters may be situated within the coverage of a macro cell. When a user equipment ('UE') moves through a path which crosses some of these pico or small cells, it may undergo many handovers. For example, a UE which traverses between two pico cells will undergo two handovers: one from the first pico cell to the macro cell, and from the macro cell to the next pico cell.

The above mentioned handovers result in data interruption for each handover.

BRIEF DESCRIPTION OF THE DRAWINGS

The present disclosure will be better understood with reference to the drawings, in which:

FIG. 10 is a block diagram showing a simplified example network element.

DETAILED DESCRIPTION

Figure 1:
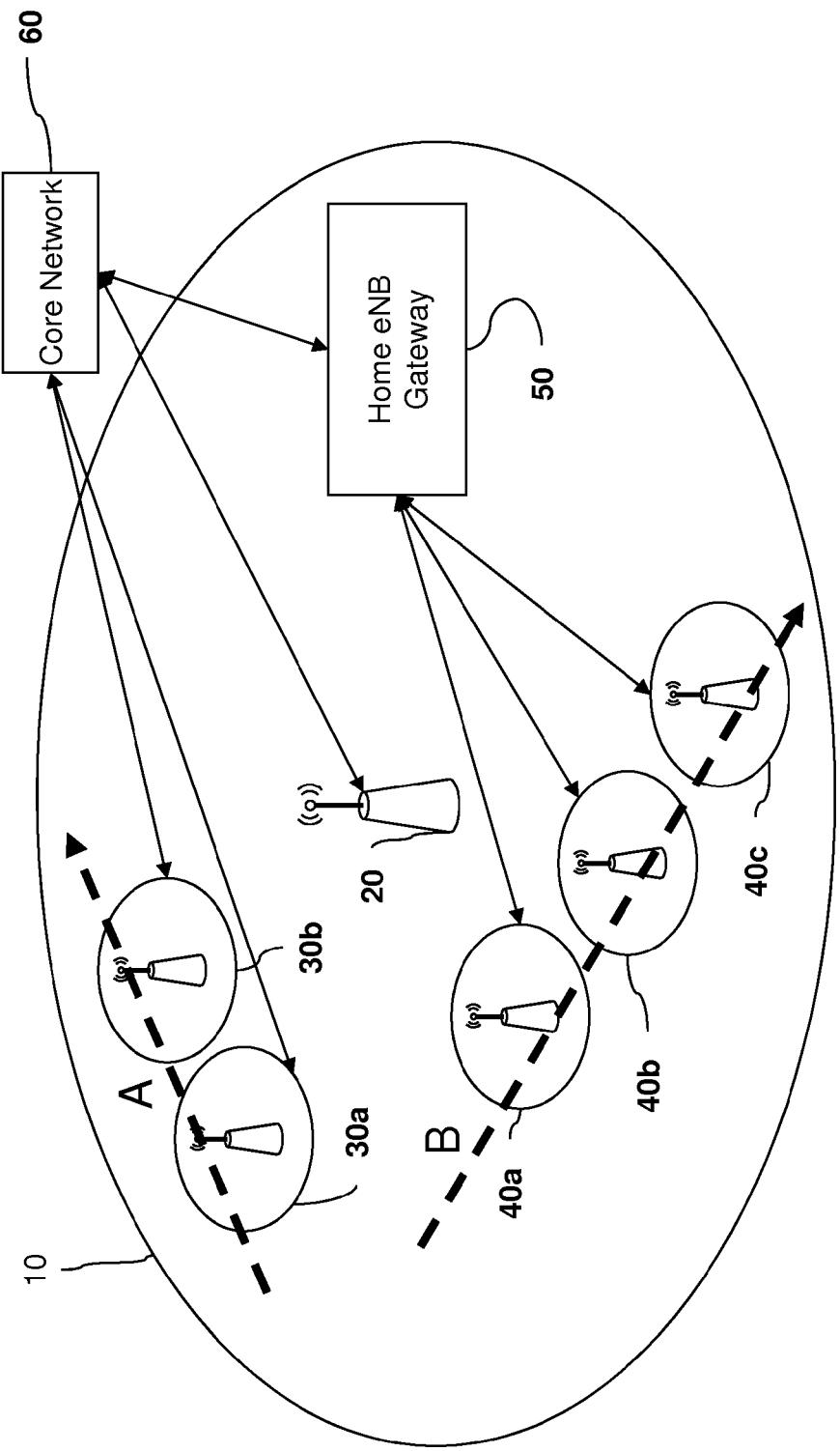
FIG. 1 is a block diagram illustrating one example of a macro cell comprising pico cells and femto cells.

The present disclosure provides a method for radio resource scheduling for a user equipment ('UE') in a heterogeneous network, comprising receiving at the UE, scheduling parameters including a first value and a second value; listening, at the UE, to a serving cell for a number of consecutive subframes corresponding with the first value; and listening, at the UE, to at least one coordinating cell for a number of consecutive subframes corresponding with the second value.

The present disclosure further provides a user equipment ('UE'), comprising a processor and a communication subsystem; wherein the processor and the communication subsystem cooperate to receive scheduling parameters including a first value and a second value; listen to a serving cell for a number of consecutive subframes corresponding with the first value; and listen to at least one coordinating cell for a number of consecutive subframes corresponding with the second value.

The present disclosure further provides a method for radio resource scheduling for a user equipment ('UE') in a heterogeneous network, comprising sending, from a serving cell, scheduling parameters to the UE, the scheduling parameters indicating subframes associated to the serving cell and subframes associated to a plurality of coordinating cells; and establishing, at the eNB of the serving cell, a connection with the UE during the subframes associated to the serving cell.

The present disclosure further provides an enhanced Node B ('eNB') of a serving cell, configured for radio resource scheduling of a user equipment ('UE') in a heterogeneous network, comprising a processor and a communication subsystem; wherein the processor and the communication subsystem cooperate to send scheduling parameters to the UE, the scheduling parameters indicating subframes associated to the serving cell and subframes associated to a plurality of coordinating cells; and establish a connection with the UE during the subframes associated to the serving cell.

The present disclosure further provides a method for synchronizing a serving cell and at least one coordinating cell, comprising sending, from the serving cell, a request to a UE to measure a subframe offset for each of the at least one coordinating cell; receiving, at the serving cell, from the UE, the subframe offset for each of the at least one coordinating cell; and determining, at the serving cell, subframe numbers for each of the at least one coordinating cell based on the subframe offset for each of the at least one coordinating cell.

The present disclosure further provides an enhanced Node B ('eNB') of a serving cell, configured for synchronizing the serving cell and at least one coordinating cell, comprising a processor and a communication subsystem; wherein the processor and the communication subsystem cooperate to send a request to a UE to measure a subframe offset for each of the at least one coordinating cell; receive from the UE the subframe offset for each of the at least one coordinating cell; and determine subframe numbers for each of the at least one coordinating cell based on the subframe offset for each of the at least one coordinating cell.

The present disclosure further provides a method for synchronizing a serving cell and at least one coordinating cell, comprising receiving, at a UE, a request to measure a subframe offset for each of the at least one coordinating cell; computing, a the UE, the subframe offset for each of the at least one coordinating cell; and sending, from the UE to the serving cell, the subframe offset for each of the at least one coordinating cell.

The present disclosure further provides a user equipment ('UE') comprising a processor and a communication subsystem; wherein the processor and the communication subsystem cooperate to receive a request to measure a subframe offset for each of the at least one coordinating cell; compute the subframe offset for each of the at least one coordinating cell; and send to the serving cell, the subframe offset for each of the at least one coordinating cell.

Reference is now made to FIG. 1. FIG. 1 illustrates a macro cell 10, served by eNB 20. Macro cell 10 includes pico cells 30a and 30b. As illustrated by arrows, pico cells 30a and 30b communicate with the core network 60 directly, as does macro cell 10. Macro cell 10 further includes femto cells 40a, 40b and 40c, who are connected to the core network 60 via Home eNB Gateway ('HeNB-GW') 50.

As seen in FIG. 1, a UE moving in the trajectories indicated by arrows A or B will undergo many handovers.

Figure 2:
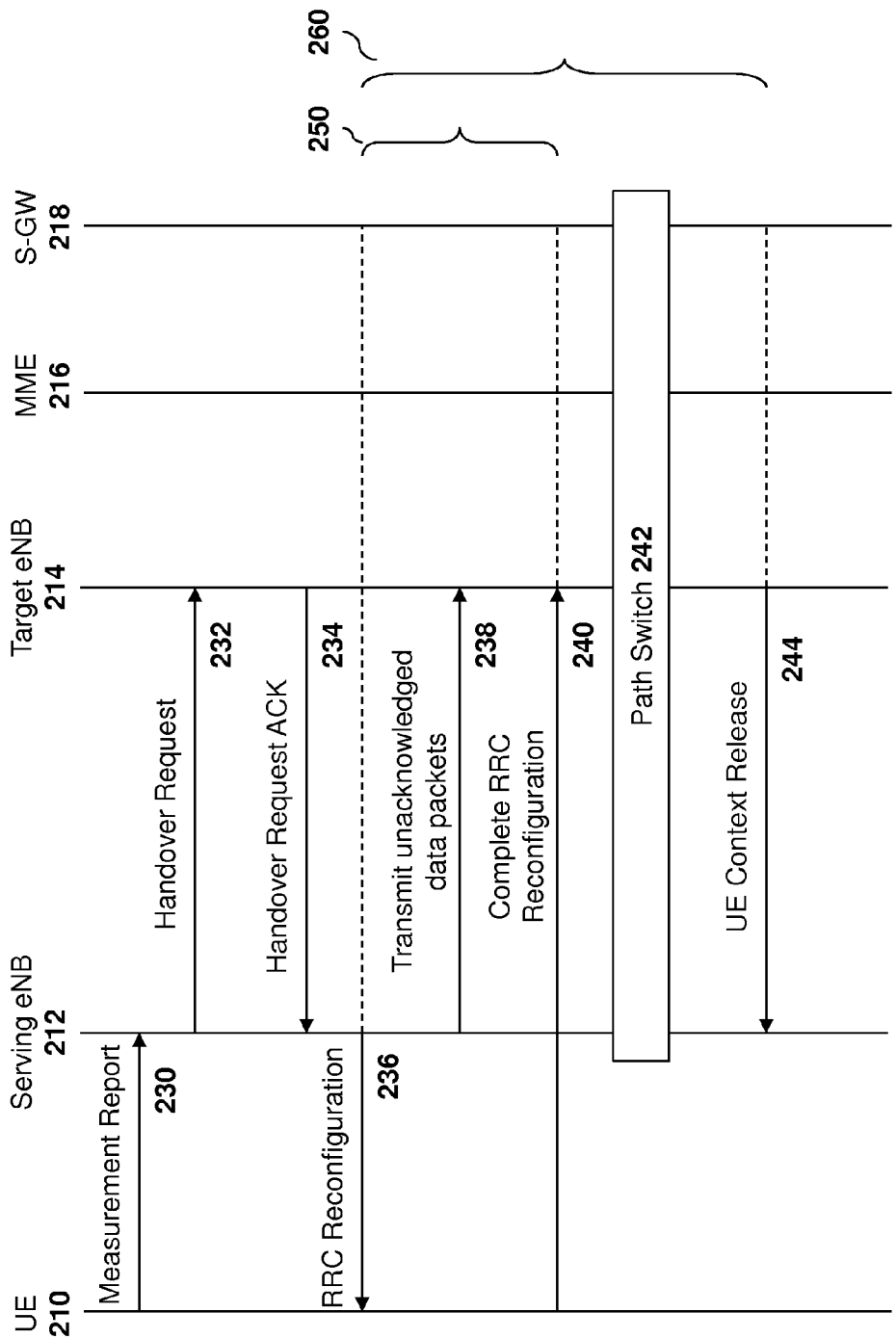
FIG. 2 is a data flow diagram illustrating current handover procedures.

Reference is now made to FIG. 2, showing a handover procedure between a serving eNB and a target eNB in a Third Generation Partnership Project (3GPP) Long Term Evolution (LTE) architecture. While the present disclosure relates to the 3GPP LTE architecture, the present disclosure is not so limited and concepts described therein are applicable to other types of network architecture.

At message 230, the UE 210 sends a measurement report to the serving eNB 212. The serving eNB 212 makes a handover decision based on the measurement report, and in the event the serving eNB 212 decides that a handover is required, a handover request is sent to target eNB 214, at message 232. In response, a handover request ACK is provided to the serving eNB at 234 and the target eNB 214 decides if it has sufficient resources to accept UE 210.

At message 236, the serving eNB 212 transmits an RRC reconfiguration message to the UE 210, for assisting the UE in configuring itself for communication with the target eNB 214.

At message 238, the serving eNB 212 transmits unacknowledged data packets intended for UE 210 to target eNB 214.

At message 240, the UE indicates to target eNB 214 that its RRC reconfiguration is complete.

At block 242, path switch messages are exchanged between the target eNB 214, the Mobility Management Entity ('MME') 216, the Serving Gateway ('S-GW') 218, and the serving eNB 212. The path switch procedure informs the network of the handover.

Once the target eNB 214 receives an acknowledgement of the path switch messages from MME 216, target eNB 214 sends a UE Context Release message to the serving eNB 212, indicating that the handover is successfully completed.

Importantly, during a successful handover procedure as described above, the UE may not send uplink data during the period indicated by bracket 250, and the UE may not receive downlink data during the period indicated by bracket 260.

Reference is now made to FIGS. 3A, 3B, 3C, and 3D showing a UE at different positions within a macro cell comprising a low power cell.

Low power cells may be stand-alone or non-stand-alone. A stand-alone cell is a cell through which the UE can attach to the LTE network. A non-stand-alone cell is a cell through which the UE may not attach directly to the LTE network. When the low power cell is a stand-alone cell, a UE can perform a cell search and find a cell on a frequency and attach itself to the LTE network by connecting to that cell.

Since the macro cells are typically planned for large coverage areas, generally control messages such as Radio Resource Control ('RRC') and Non Access Stratum ('NAS') signals are transmitted and received through the macro cell. In some cases, the data may be routed through the low power cell if there is a dearth of radio resources at the macro cell.

Figure 3A:
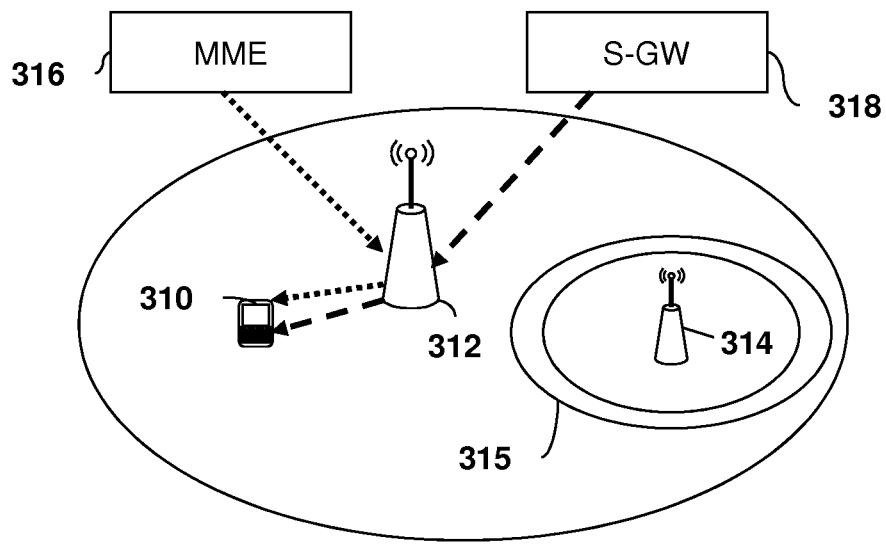
FIG. 3A is a block diagram illustrating a UE served by a macro cell.

In FIG. 3A, the UE 310 is served by macro cell 312, as it is outside the coverage area of low power cell 314. Control signaling from MME 316 (represented by short-dashed line) is routed to the UE 310 through macro cell 312, as is data from S-GW 318 (represented by long-dashed lines).

Figure 3B:
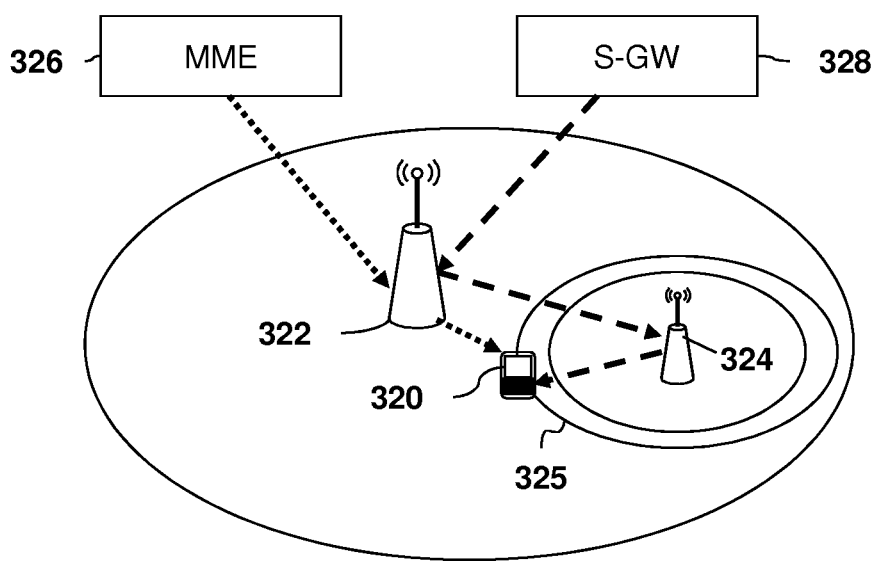
FIG. 3B is a block diagram illustrating a UE receiving control signaling from a macro cell but receiving data from a low power cell.

In FIG. 3B, UE 320 is within Cell Range Expansion ('CRE') region 325 of low power cell 324. In the scenario of FIG. 3B, the UE is arriving in CRE 325 from the macro cell. As shown in FIG. 3B, data from S-GW is routed to the macro cell 322, to low power cell 324, and then to the UE 320. Control signaling from MME 326 is routed from the macro cell 322 directly to the UE 325.

Figure 3C:
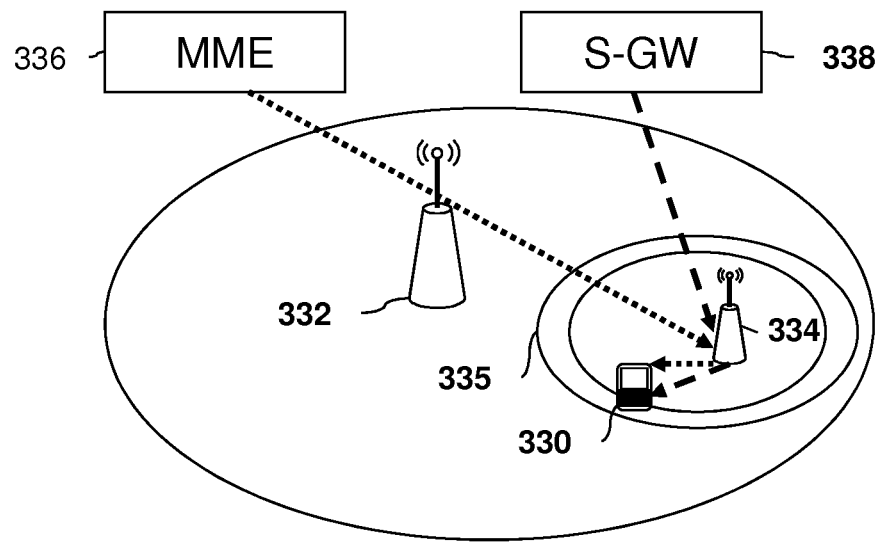
FIG. 3C is a block diagram illustrating a UE served by a low power cell.

In FIG. 3C, UE 330 is within the coverage area of low power cell 334, and both data from S-GW 338 and control signaling from MME 336 are routed through low power cell 334 to the UE 330. However, UE 330 could also connect to both macro cell 332 and low power cell 334, particularly if low power cell 334 is a non-stand-alone cell.

Figure 3D:
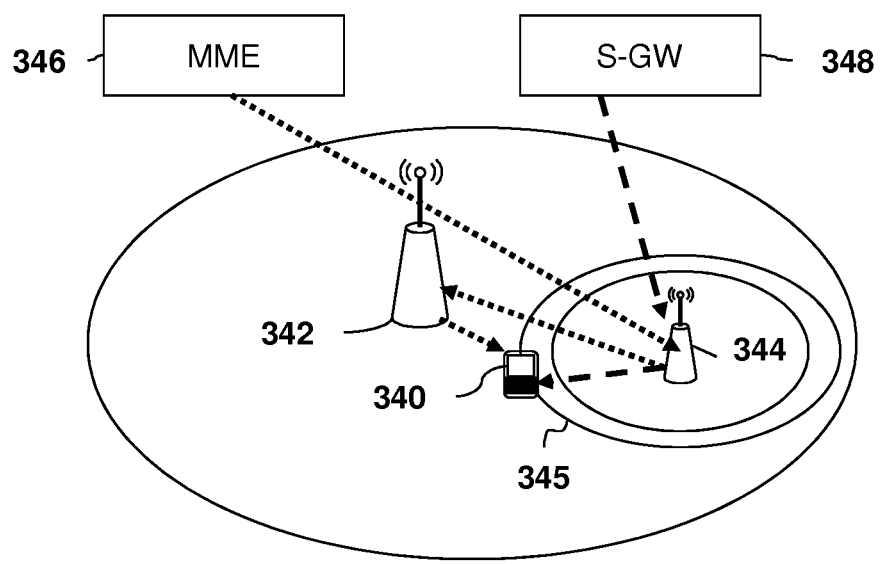
FIG. 3D is a block diagram illustrating a UE receiving control signaling from a macro cell but receiving data from a low power cell.

In FIG. 3D, UE 340 is within CRE 345 of low power cell 344, as in the case of FIG. 3B. However, in FIG. 3D, the UE was previously connected to low power cell 344 and is moving towards macro cell 342. As shown in FIG. 3D, data from S-GW is routed through low power cell 344, and control signaling from MME 346 is routed through low power cell 344, to macro cell 342, and then to the UE 340.

Figure 4:
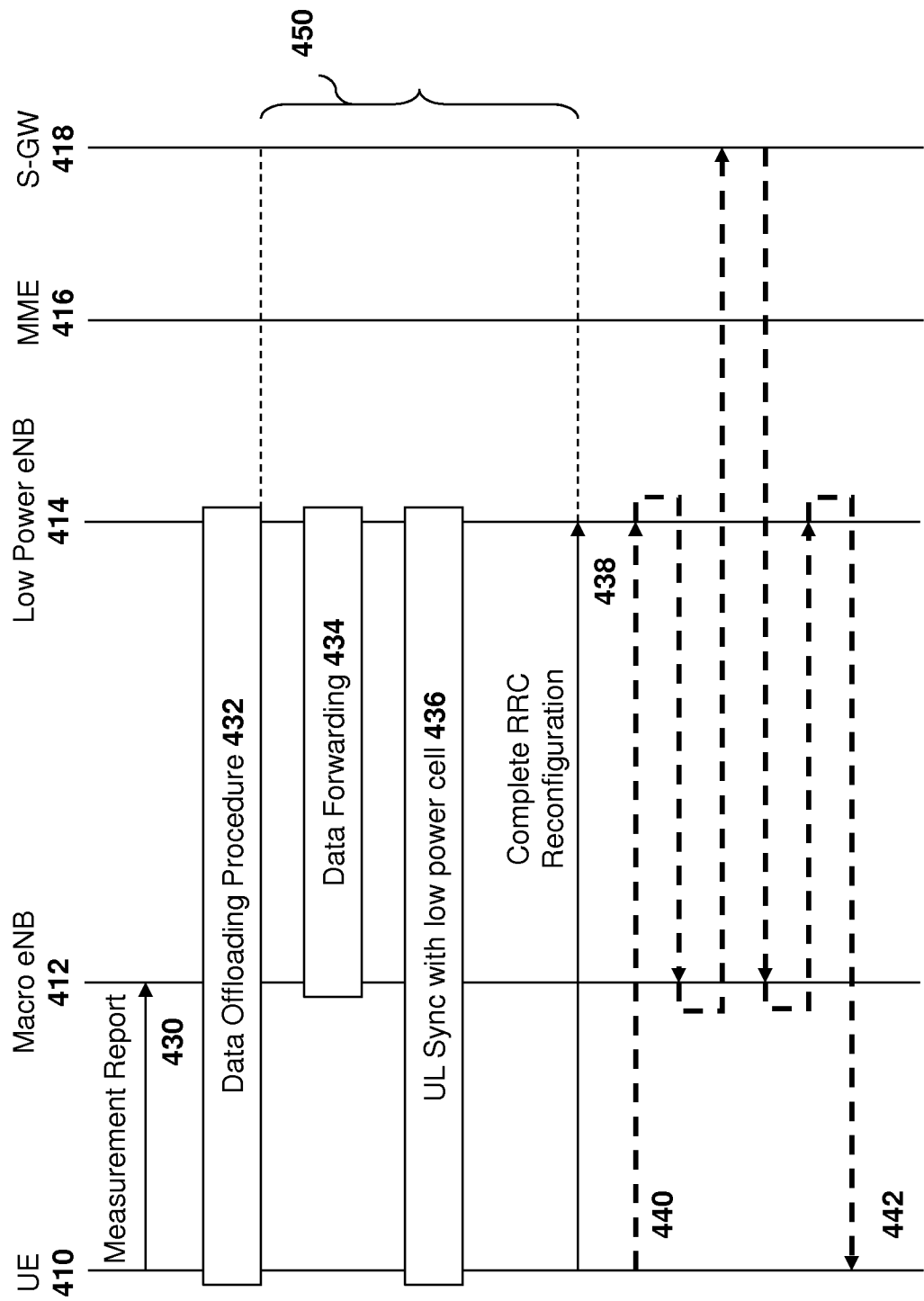
FIG. 4 is a data flow diagram illustrating a procedure for data/control offloading.

Therefore, a serving cell may offload data or control signaling to a near-by cell. A procedure for data offloading is shown with reference to FIG. 4. In FIG. 4, a UE 410 communicates with macro eNB 412 and can also see low power eNB 414. Both macro eNB 412 and low power eNB 414 can communicate with MME 416 and S-GW 418.

As seen in FIG. 4, at message 430 a measurement report is sent from the UE 410 to the macro eNB 412. At block 432, the data offloading procedure is performed. Then, at block 434, data is forwarded between the macro eNB 412 and the low power eNB 414.

At block 436, the UE performs an uplink synchronization with the low power eNB 414, and indicates that RRC Reconfiguration is complete at message 438. Notably, the path switch procedure 242 shown in FIG. 2 is not performed.

After the data offloading procedure of FIG. 4, uplink messages travel as illustrated by dashed line 440. Specifically, an uplink message goes from UE 410 to low power eNB 414, to macro eNB 412, and to S-GW 418. Similarly, downlink messages go from S-GW 418 to macro eNB 412, to low power eNB 414, to UE 410.

In a typical heterogeneous cellular deployment, low-power cells, such as pico cells or femto cells are deployed as an overlay to the existing planned homogeneous deployments. Normally the overlay deployment is done in an unplanned manner. The overlay deployment is intended to meet the demand for ever-increasing mobile data applications or to improve coverage. As seen above, the serving eNB may offload data or control plane traffic for a UE via a near-by low power cell. During data offloading, the UE is in an RRC_connected state with both the serving cell and the coordinating cell, at the same time. Therefore, the resources assigned by each of the serving cell and the coordinating cells should be coordinated properly to avoid conflicts. Proper coordination may require accurate knowledge of the subframe timing differences between the serving eNB and the coordinating eNB.

Furthermore, low power eNBs may be installed independently and powered on and off as needed.

Resource Allocation Between Macro and Low-Power eNBs

Static Scheduling

Figure 5:
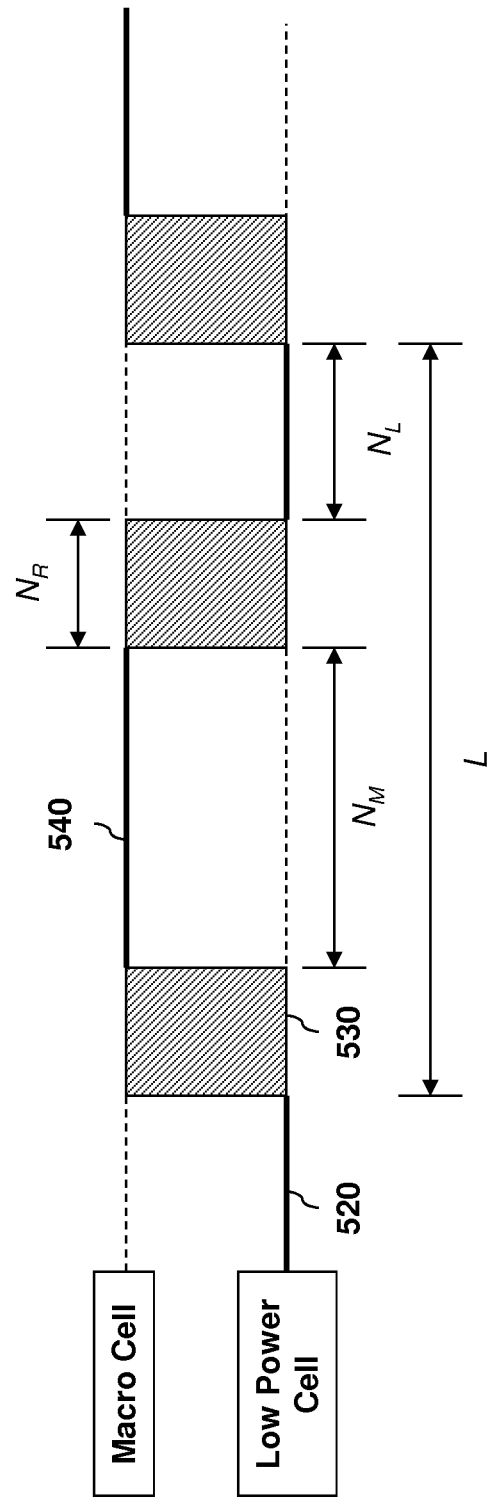
FIG. 5 is a diagram illustrating radio resource scheduling for a UE according to at least one embodiment of the present disclosure.

According to one embodiment, UEs may be pre-scheduled to listen to the serving cell and the coordinating cell intermittently. FIG. 5 illustrates the tuning of a radio on the UE, and in particular, the tuning to the frequency of the macro cell, small cell and transition periods. As illustrated in FIG. 5, the UE is scheduled to be in communication with the macro eNB for $N_M$ subframes (or milliseconds) and with the low power cell for $N_L$ subframes in every L consecutive subframes. For every transition from the macro cell to the low power cell and vice versa, $N_R$ subframes are allotted to the UE to allow the UE to prepare for the transition. In some implementation, the $N_R$ subframes may include a number of extra subframes beyond the subframes needed for UE transition. During the extra subframes, the UE may listen to neither the macro cell nor the low power cell. In at least some embodiments, the UE prepares for the transition by retuning its transceiver to a different frequency or adjusting its transmission power.

In at least some embodiments, the parameters $N_M$, $N_L$, and $N_R$ are exchanged between the serving cell and the coordinating cells before the data offloading commences. The serving cell, whether it is the macro cell or the low power cell, may decide the bandwidth sharing between control and data transmissions and set appropriate values for $N_M$, $N_L$, and $N_R$, and inform the coordinating cells and the UE. In at least some embodiments, initial bandwidth estimates for data offloading may be based on quality of service ('QoS') requirements of an application. Similarly, an estimate of the bandwidth is required for the control signal offloading. In at least some embodiments, the bandwidths are further adjusted when data transmission commences.

As seen in FIG. 5, the UE may listen to a macro cell or a low power cell intermittently, based on the values of $N_M$, $N_L$, and $N_R$. In FIG. 5, a bolded line indicates that the UE listens to the corresponding cell for the period represented by the length of the line. Thus, at 520 the UE listens to the low power cell. At 530, the UE transitions between the low power cell and the macro cell, and at 540 the UE listens to the macro cell.

Also as seen in FIG. 5, the UE listens to the low power cell for $N_L$ subframes, to the macro cell for $N_M$ subframes, and uses $N_R$ subframes for transitioning between the low power cell and the macro cell. The length of the cycle is L, such that $L=N_M+N_L+2*N_R$. In some implementation, the length of the cycle L could be more than $N_M+N_L+2*N_R$ and the UE listens to neither the macro cell nor the small cell during the last $L-(N_M+N_L+2*N_R)$ subframes.

In at least some embodiments, the UE communicates with the macro cell during subframes n to $(n+N_M-1)$, when n satisfies the condition mod(n, L)=p, where p is a number between 0 and L−1.

If the UE starts communicating with the macro cell at subframe n, it will start transitioning to the macro cell at subframe $n-N_R$.

In cases where there are two coordinating cells, the UE will communicate with the serving cell and first coordinating cell during the subframes $(n+N_R, n+N_R+N_M-1)$ and $(n+N_M+2N_R, n+N_M+2N_R+N_{L1}-1)$ respectively, where n is the subframe at which the UE starts transitioning to the serving cell, and $N_{L1}$ is the number of subframes reserved for listening to the first coordinating cell.

Generally, if there are C coordinating cells, the UE will communicate with the i-th coordinating cell starting at subframe A and ending at subframe B, such that:

$$A + n + N_m + (i+1)N_R + \sum_{j=1}^{i-1} N_{Lj} \quad (1)$$

and, $$B = n + N_M + (i+1)N_R + \sum_{j=1}^{i-1} N_{Lj} + N_{Li} - 1. \quad (2)$$

Where $N_{Lj}$ is the number of subframes during which the UE communicates with the j-th coordinating cell. According to this convention, the length of the cycle, L is computed by:

$$L = N_M + (C+1)N_R + \sum_{j=1}^{C} N_{Lj} \quad (3)$$

Figure 6:
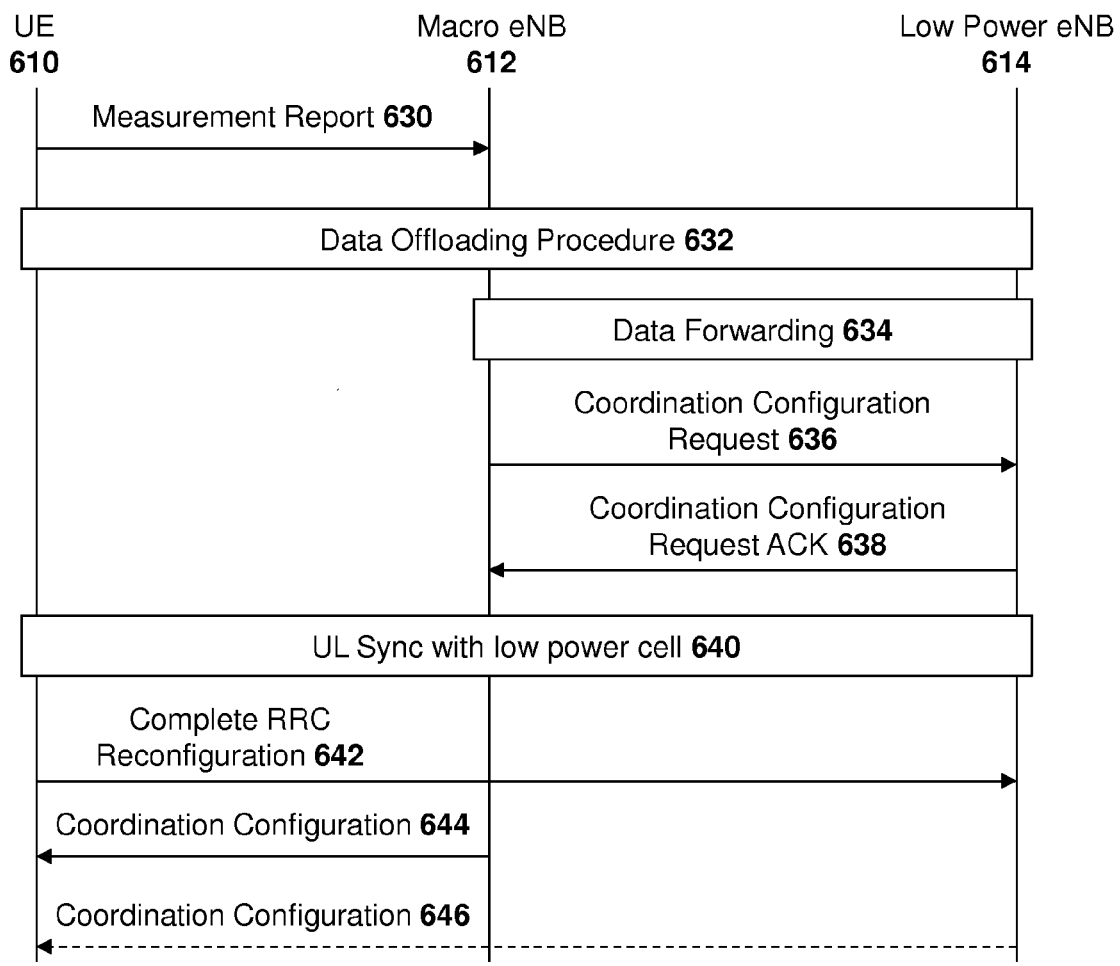
FIG. 6 is a data flow diagram illustrating how coordinating cells and a UE are configured according to at least one embodiment of the present disclosure.

Reference is now made to FIG. 6. FIG. 6 shows a message flow diagram as shown in FIG. 4 but with additional steps to configure the serving cells and the low power cells with the coordination parameters. Notably, FIG. 6 depicts a scenario in which the macro cell is the serving cell.

The procedure starts with message 630 in which a measurement report is sent from the UE 610 to the macro cell 612. At block 632, the data offloading procedure is performed, and at block 634 data is forwarded between the macro cell and the low power cell or cells.

As shown with message 636, the macro cell 612 sends a Coordination Configuration Request message to the low power cell or cells. In at least one embodiment, the Coordination Configuration Request is included in an RRC Connection Reconfiguration message. In at least some embodiments, the message includes some or all of the following parameters:
  the coordination cell list (including Physical Cell Identifier ('PCI') and carrier frequency;
  the cell association time for each coordinating cell $N_L$;
  serving cell association time $N_M$;
  switching time $N_R$;
  cyclic parameter p.

Using message 638, the low power cell responds with an acknowledgement of the Coordination Configuration Request message. In at least some embodiments, the low power cell's response may include changes to the parameters provided in the Coordination Configuration Request message. If there is more than one low power cell, each low power cell may provide proposed changes to the parameters with respect to itself.

In some embodiments, messages 636 and 638 are sent after the uplink synchronization 640. In other embodiments, messages 636 and 638 can be sent as part of Data Offloading Procedure 632. For example, coordination configuration messages may be piggybacked onto a handover request and a handover request acknowledgement. One example of the coordination configuration message is shown in Table 1.

TABLE 1

Coordination Configuration Message

| IE/Group Name | Presence | Range | IE type and reference | Semantics description | Criticality | Assigned Criticality |
|---|---|---|---|---|---|---|
| Message Type | M | | 9.2.13 | | Yes | reject |

TABLE 1-continued

| | | | | | | |
|---|---|---|---|---|---|---|
| | | | | Coordination Configuration Message | | |
| IE/Group Name | Presence | Range | IE type and reference | Semantics description | Criticality | Assigned Criticality |
| Serving eNB UE X2AP ID | M | | eNB UE X2AP ID 9.2.24 | Allocated at the source eNB | Yes | reject |
| Cause | M | | 9.2.6a | | Yes | ignore |
| Coordinating eNB UE X2AP ID | M | | eNB UE X2AP ID 9.2.24 | Allocated at the coordinating eNB | Yes | reject |
| UE Context Information | | 1 | | | Yes | reject |
| >Association Context | M | | OCTET STRING | Includes the RRC message with the UE association information | — | — |

An example of the coordination configuration message response is shown in Table 2.

TABLE 2

| | | | | | | |
|---|---|---|---|---|---|---|
| | | | Coordination Configuration Message Response | | | |
| IE/Group Name | Presence | Range | IE type and reference | Semantics description | Criticality | Assigned Criticality |
| Message Type | M | | 9.2.13 | | Yes | reject |
| Coordinating eNB UE X2AP ID | M | | eNB UE X2AP ID 9.2.24 | Allocated at the coordinating eNB | Yes | reject |
| Cause | M | | 9.2.6a | | Yes | ignore |
| Serving eNB UE X2AP ID | M | | eNB UE X2AP ID 9.2.24 | Allocated at the source eNB | Yes | reject |
| UE Context Information | | 1 | | | — | ignore |
| >Association Context | M | | OCTET STRING | Includes the RRC message with the UE association information with suggested changes. | — | — |

After the UL synchronization 640, the serving cell 612 transmits the coordination parameters to the UE 610 with message 644.

Optionally, the coordination parameters are also provided to the UE by each of the low power cells 614 with message 646.

By multicasting the coordination parameters from multiple cells, the probability of correct detection at the UE can be increased. Further improvements in reception can be achieved if the identical messages transmitted by all the coordinating cells can be soft combined by the UE during the reception. However, the UE should know the transmission timing of these messages from each of the coordinating cells.

The value of L, the length of a full cycle in which the UE listens to the serving cell and each of the coordinating cells, can be network specific, or can be cell specific. When L is configured as a cell specific parameter, its value may be broadcast by the serving cell. For example, such broadcast may be in System Information Block Type 2 ('SIB2') as shown below with regards to Table 3.

TABLE 3

SystemInformationBlockType2 information element

```
-- ASN1START
SystemInformationBlockType2 ::=    SEQUENCE {
    ac-BarringInfo                 SEQUENCE {
```

TABLE 3-continued

SystemInformationBlockType2 information element

```
    ac-BarringForEmergency         BOOLEAN,
    ac-BarringForMO-Signalling     AC-BarringConfig
OPTIONAL,   -- Need OP
    ac-BarringForMO-Data           AC-BarringConfig             OPTIONAL -
}
OPTIONAL,   -- Need OP
radioResourceConfigCommon         RadioResourceConfigCommonSIB,
ue-TimersAndConstants             UE-TimersAndConstants,
freqInfo                          SEQUENCE {
    ul-CarrierFreq                ARFCN-ValueEUTRA
OPTIONAL,   -- Need OP
    ul-Bandwidth                  ENUMERATED {n6, n15, n25, n50, n75, n100}
OPTIONAL,   -- Need OP
    additionalSpectrumEmission    AdditionalSpectrumEmission
},
mbsfn-SubframeConfigList          MBSFN-SubframeConfigList
OPTIONAL,   -- Need OR
timeAlignmentTimerCommon          TimeAlignmentTimer,
...,
lateNonCriticalExtension          OCTET STRING
OPTIONAL,   -- Need OP
[[  ssac-Barring ForMMTEL-Voice-r9     AC-BarringConfig
OPTIONAL,   -- Need OP
    ssac-Barring ForMMTEL-Video-r9     AC-BarringConfig
OPTIONAL-- Need OP
]],
[[  ac-BarringForCSFB-r10              AC-BarringConfig         OPTIONAL -
]],
[[  UEAssociationConfig-rxxxx          UEAssociationConfig
OPTIONAL-- Need OP
]]
}
AC-BarringConfig ::=              SEQUENCE {
    ac-BarringFactor              ENUMERATED {
                                      p00, p05, p10, p15, p20, p25, p30, p40,
                                      p50, p60, p70, p75, p80, p85, p90, p95},
    ac-BarringTime                ENUMERATED {s4, s8, s16, s32, s64, s128,
s256, s512},
    ac-BarringForSpecialAC        BIT STRING (SIZE(5))
}
UEAssociationConfig-rxxxx ::=     SEQUENCE {
    L-typical
    N_R-inter-frequency
    N_R-intra-frequency
    N_L-typical
}
MBSFN-SubframeConfigList ::=      SEQUENCE (SIZE (1..maxMBSFN-
Allocations)) OF MBSFN-SubframeConfig
-- ASN1STOP
```

Typical values for L, $N_L$, $N_R$ for intra and inter-frequency may also be provided with SIB2. When the serving cell intends to change these values or make these values UE-specific, the new parameter values or the UE-specific values may be included within an information element of an RRC message. For example, a UEAssociationInfo information element, as shown in Table 4 below, may be used. According to some embodiments, if the UE receives different parameter values in SIB2 and the UEAssociationInfo information element, the UE may use the parameters from the UEAssociationInfo information element. In another alternative, the values for L, $N_L$, $N_R$ may also be provided in other SIB signaling or other broadcast messages.

TABLE 4

UEAssociationInfo information element

```
-- ASN1START
UEAssociationInfo ::=    SEQUENCE {
    coordinatingCellList         CoordinatingCellList      OPTIONAL,   -- Need
OR
    N_M                                    ENUMERATED{ },
    N_R                                    ENUMERATED{ }
    OPTIONAL,     -- Need OP
    p                                      ENUMERATED{ }
    ...
}
CoordinatingCellList ::=   SEQUENCE (SIZE (1..maxCellIntra)) OF
IntraFreqNeighCellInfo
```

TABLE 4-continued

UEAssociationInfo information element

```
IntraFreqNeighCellInfo ::=    SEQUENCE {
    physCellId                   PhysCellId,
    carrierFrequency             CarrierFrequency,
    N_L                                    ENUMERATED{ }
}
-- ASN1STOP
```

The serving cell may optimize L such that there is no conflict between the DRX cycle and the resource sharing cycle. Alternatively, the serving cell and the coordinating cells should be aware of both these cycles so that there is no conflict.

Dynamic Scheduling

As presented above, static resource partitioning for control signaling and data may be effective. However, based on the value of L, data transmission interruptions or loss of data may be more or less frequent. For example, while the UE is communicating with a low power cell, the UE may be required to send a measurement report to the macro cell. In order to send the measurement report, the UE must wait until the next opportunity to communicate with the macro cell, causing a delay in the measurement report reporting. This problem can be partially alleviated by selecting a small value of L. However, a small value of L may reduce the system and spectrum usage efficiency, η, defined in equation 4 below.

$$\eta = \frac{N_R}{L} \quad (4)$$

To improve the spectrum usage efficiency, resource sharing can be fully or partially dynamic. For example, a large value for L can be configured and if there is a need for RRC or NAS signaling, a low power cell may direct the UE to listen to the macro cell for RRC messages. Similarly, on the uplink, the UE may indicate to the low power cell a need for communications with the macro cell during a data transmission.

During downlink communications, the need for sending an RRC message to an RRC_connected UE is decided either by the macro cell or the low power cell, depending on how the RRC functionality is split between the macro cell and the low power cells. If a low power cell makes a decision to send an RRC message and the UE is associated with the low power cell at that time and for the next ζ subframes, the low power cell can include a Medium Access Control ('MAC') element to indicate that the UE should listen to the macro cell after β subframes, where ζ>β+T, and T represents the expected delay incurred by coordination signaling over a backhaul link between eNBs.

On the other hand, if the macro cell makes the decision to send an RRC message, the macro cell may inform the low power cell to inform the UE of its decision.

On the uplink, if the UE intends to send an RRC or NAS message, the UE may indicate its intentions on the Physical Uplink Shared Channel ('PUSCH') on a MAC control element. In another alternative, a new layer 1 control signaling may be designed for this purpose, or the current scheduling request (SR) channel may be extended to achieve this, by for example, providing another SR channel but with lower rate. But generally, for the simplicity, MAC control element alternative is slightly preferred.

Specifically, one of the reserved values for the Logical Channel Identifier ('LCID') of a MAC Control Element may be used to indicate a request for an RRC message to a coordinating cell, or an indication that an RRC message was scheduled by a coordinating cell, as shown in bold in Tables 5 and 6 below. While Tables 5 and 6 indicate the value '01011', those skilled in the art will appreciate that any of the reserved values may be used for this purpose.

TABLE 5

Values of LCID for Downlink MAC CE

| Index | LCID values |
| --- | --- |
| 00000 | CCCH |
| 00001-01010 | Identity of the logical channel |
| 01011 | Indication of RRC message scheduled by a coordinating cell |
| 01100-11010 | Reserved |
| 11011 | Activation/Deactivation |
| 11100 | UE Contention Resolution Identity |
| 11101 | Timing Advance Command |
| 11110 | DRX Command |
| 11111 | Padding |

TABLE 6

Values of LCID for Uplink MAC CE

| Index | LCID values |
| --- | --- |
| 00000 | CCCH |
| 00001-01010 | Identity of the logical channel |
| 01011 | Grant Request for RRC message to a coordinating cell |
| 01100-11000 | Reserved |
| 11001 | Extended Power Headroom Report |
| 11010 | Power Headroom Report |
| 11011 | C-RNTI |
| 11100 | Truncated BSR |
| 11101 | Short BSR |
| 11110 | Long BSR |
| 11111 | Padding |

The MAC control element is identified by a MAC PDU subheader with the LCID field as specified in Tables 5 and 6 above.

Figure 7:
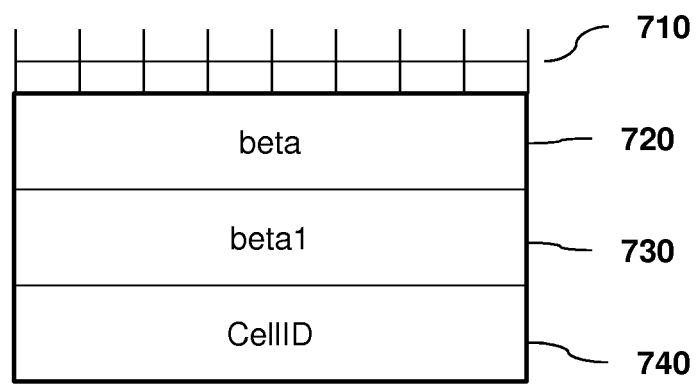
FIG. 7 is a block diagram illustrating a MAC control element according to at least one embodiment of the present disclosure.

An example of a MAC control element is shown with respect to FIG. 7. As seen in FIG. 7, the MAC control element includes a first portion (not shown) represented at 710. The MAC control element further includes a value 720 for β, a value 730 for β1, and a value 740 for the CellID.

The MAC control element has a fixed size and comprises the following fields:

β: This field contains the subframe offset. The length of the field is 8 bits.

β1: This field contains the subframe range. The length of this field is 8 bits.

CellID: This field contains the coordinating cell ID. The cell ID may be a temporary ID assigned by the serving cell during the coordination configuration.

In some embodiments, the UE receives the RRC or NAS message between subframe (n+β) and subframe (n+β+β1), where n is the current subframe number.

UE Assisted Subframe-Number-Offset Determination

As outlined above, when the UE is initially attached to the macro cell and moving towards a low power cell, the data traffic may be offloaded by the macro cell to the low power cell. During the initiation of this offloading procedure, the macro eNB should configure the coordination parameters and inform the UE of these parameters. These parameters may include pre-scheduling information, so that the UE may be aware of the time during which it has the opportunity to communicate with the macro cell or the MME.

For example, the UE may be configured to listen to the macro cell if the subframe number n meets the following criterion: mod(n, L)=p; where n is the macro cell's subframe number. L and p are communicated to the UE by the macro cell during the coordination configuration setup, as is the value of $N_R$. These values are also communicated to the low power cells over the backhaul interface. Low power cells may schedule data packets for the UE during the subframes assigned to them as described in FIG. 5. Low power cells should be aware of the relative subframe numbering of the macro cell to schedule transmission of data packets. However, subframe numbers between two eNBs may not be synchronized. If the eNBs try to synchronize their subframe numbers by exchanging information over the backhaul interface, the unpredictability of the backhaul delay means that synchronization may fail.

This issue may be resolved by involving the UE. For example, the UE may be asked by the serving cell to read the system frame number (SFN) and the subframe number of coordinating cells, and the difference may be reported to the serving cell.

Normally, this measurement may take some time if the UE is not already synchronized with the coordinating cells. The serving cell may provide a fixed time for uplink resources in which the UE may send the SFN delta report.

In at least some embodiments, the SFN delta report is sent as an RRC message or in a MAC payload.

In at least some embodiments, the UE computes the subframe number delta for a coordinating cell as follows.

The UE obtains the radio frame number for the serving cell, $n_R$ and the subframe number within the radio frame, $n_s$. Similarly, the UE obtains the radio frame number for the coordinating cell $m_R$, and the subframe number within the radio frame, $m_s$.

The subframe number for the serving cell is computed as $n=10n_r+n_s$. and the subframe number for the coordinating cell is computed as $m=10 m_r+m_s$, assuming there are 10 subframes per radio frame. Accordingly, values n and m represent the subframe number independently of a radio frame.

The delta value is then computed as the cyclic difference of values n and m, wherein the cyclic difference is defined by the function f of (n−m) and K, as follows:

$$f(n-m, K) = n - m \quad \text{if } -\frac{K}{2} \leq (n-m) < \frac{K}{2} \quad (5)$$

$$f(n-m, K) = n - m + K \quad \text{if } -K < (n-m) < \frac{-K}{2}$$

$$f(n-m, k) = n - m - K \quad \text{if } \frac{K}{2} \leq (n-m) < K$$

In at least some embodiments, the delta value is computed as:

$$\Delta = \mathrm{mod}(|n-m|, K) \quad (6)$$

In some embodiments, the value of K is 10240 (10 subframes for 1024 radio frames), however other values for K may be configured and the present disclosure is not so limited.

Alternatively, the differences in SFN and subframe number within a radio frame may be reported separately. The difference in SFN is provided as $\Delta_1 = f(n_r - m_r, 1024)$ where f is as defined above, and $n_r$, and $m_r$, are the SFN numbers of the serving cell and the coordinating cell. In at least one embodiment, $\Delta_1$ is represented by 10 bits, including one bit to indicate whether the difference is an advance or a delay.

The difference in subframe number within the radio frame is provided as $\Delta_2 = f(n_s - m_s, 10)$, where f is as defined above, and $n_s$ and $m_s$ are the subframe numbers within the radio frame of the serving cell and the coordinating cell. In at least one embodiment, $\Delta_2$ is represented by 4 bits, including one bit to indicate whether the difference is an advance or a delay.

Since these subframe numbers are static, the serving cell may request this measurement from some of the UEs in the RRC_connected state, a first time when the eNB is powered on, and whenever the eNB or a coordinating cell's eNB configuration is updated.

Alternatively, the serving cell may request the UE and/or the coordinating cells to measure the relative subframe offset by listening to an uplink transmission from some of the UEs connected to the serving cell. For example, coordinating cells may listen to an UL synchronization sequence, such as SRS, to measure the relative subframe offset. UE specific SRS configuration may be sent to the surrounding cells. The neighboring cells may measure the timing of these transmitted sequences relative to their own uplink timing.

The value of L may be determined by the serving cell. L may be network specific or UE specific.

Figure 8:
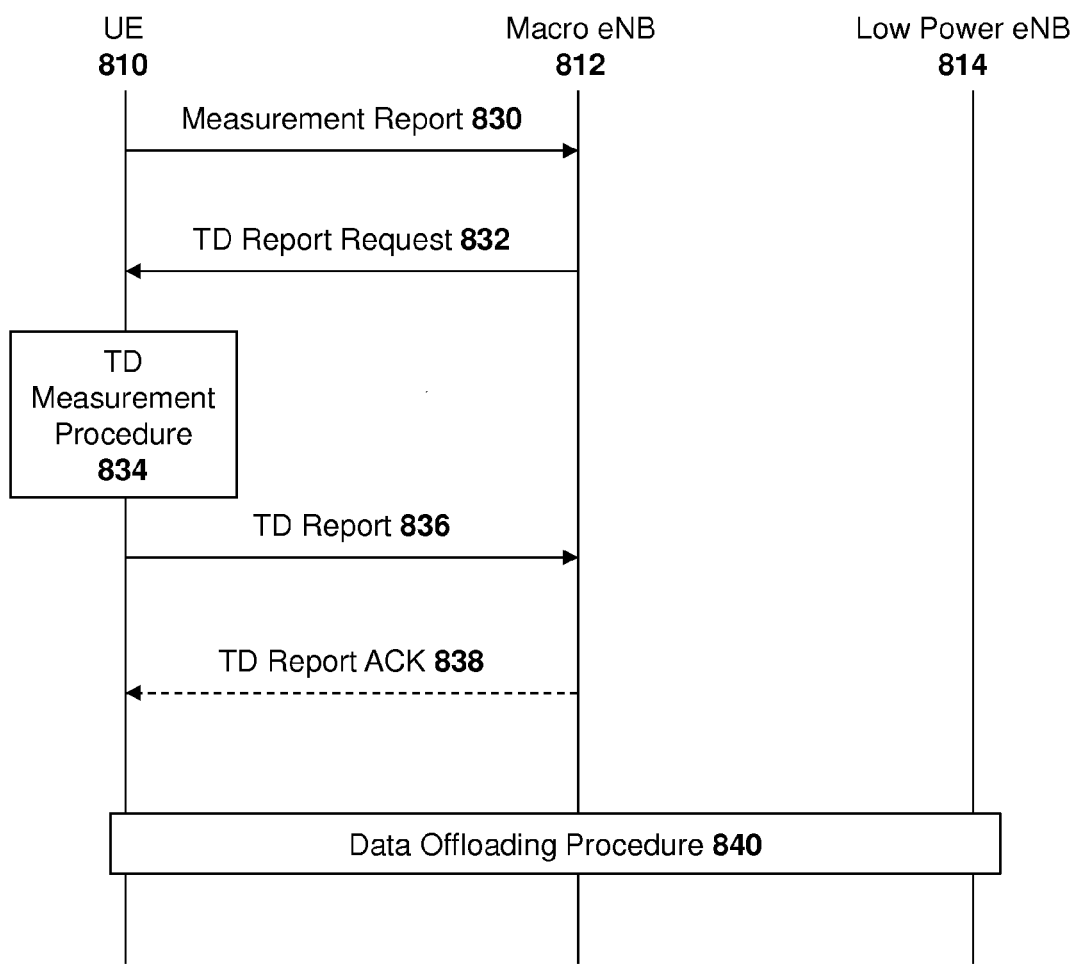
FIG. 8 is a data flow diagram illustrating how a serving cell requests and receives subframe offset information for the coordinating cells from a UE.

Reference is now made to FIG. 8 which shows the data flow for a serving cell (in this case macro cell 812) requesting subframe offsets from a UE 810. A coordinating cell (in this case low power eNB 814) can further communicate with UE 810 and macro eNB 812.

The process starts with message 830, where the UE 810 sends a measurement report to the macro (or serving) cell 812. After receiving the measurement report from the UE 810, the macro cell 812 may send a Time Difference ('TD') Report Request with message 832 to the UE 810.

The TD Report Request message may include the Cell IDs of cells with respect to which the serving cell wishes to know the subframe offset. Based on the measurement report, the macro cell 812 would know which cells the UE is close to, and may select from these cells a subset for which the UE may determine the subframe offset.

If the macro cell 812 receives measurement reports from multiple UEs, the macro cell 812 may select a UE that is closest to the cell or cells that need to be measured. This may help ensure that the subframe offset will be measured with low latency and high accuracy.

Upon receiving the TD Report Request message, the UE may perform subframe number offset determination at block 834 with respect to the cells identified in the message. The macro (or serving) cell 812 should then allow the UE enough time to access downlink message from the identified cells. For example, if the macro cell and the low power cells are on different frequencies, the macro cell 812 may give the UE 810 a 40 milliseconds gap for receiving 4 consecutive Physical Broadcast Channel ('PBCH') transmissions to determine the 2 least significant bits of the SFN, in one approach. In other cases, for example if the UE is close to the cell that needs to be measured and the Signal to Interference Noise Ratio ('SNIR') is sufficient, a 10 milliseconds gap may be enough.

In some approaches, the macro cell 812 may also provide an uplink grant in advance for the UE to send the report.

Using message 836, the UE 810 responds to the macro cell 812 with the TD Report. In at least one embodiment, the TD Report is provided in an RRC message. In at least one embodiment, the UE includes a confidence measure in the TD Report. The confidence measure indicates the accuracy of the measurement (i.e., an estimate of the measurement error) which depends on factors such as the measurement time, the measurement algorithm, and the like.

UE 810 may obtain the subframe number of the coordinating cell with the coordinating cell's PCI. First, the UE tries to acquire the subframe synchronization by correlating samples of a received signal with a locally generated Cell-specific Reference Signal ('CRS') sequence. The CRS sequence is generated based on the PCI and a selected slot number within a radio frame and a selected Orthogonal Frequency Division Multiplexing ('OFDM') symbol number within the slot. Then, the UE reads the Master Information Block ('MIB') transmitted by the cell.

After the TD Report is transmitted by the UE 810, the macro cell 812 optionally responds with an ACK with message 838. The above data offloading procedure may then be performed, as shown at block 840.

The above procedure for measuring the subframe offset number of coordinating cells may be performed after receiving the measurement report from a UE, as depicted in FIG. 8. Alternatively, the above procedure may be triggered across the network, e.g., by a newly installed eNB, when a eNB is powered on or reset, when a neighboring eNB is reset, or when a eNB receives a message to the effect that a eNB was turned on.

In at least some embodiments, the TD Report Request, the TD Report and the TD Report ACK are new messages. In at least some other embodiments, the TD Report Request may be provided over a MAC control element.

The above may be implemented by changing section 5.5.3.1 of the 3GPP Technical Specification (TS) 36.331 V10.3.0 (2011-09) "Technical Specification: Evolved Universal Terrestrial Radio Access (E-UTRA); Radio Resource Control (RRC); Protocol Specification (Release 10)" incorporated herein by reference, as shown by the bold portions in the example of Table 7. Further, changes may be made to information elements to convey the information. For example, the ReportConfigEUTRA information element may be amended, as shown by the bold portions in Table 8. Other or different changes are possible.

TABLE 7

Performance Measurement Changes

5.5.3 Performing measurements
5.5.3.1 General
For all measurements the UE applies the layer 3 filtering as specified in 5.5.3.2, before using the measured results for evaluation of reporting criteria or for measurement reporting.
The UE shall:
  1> whenever the UE has a measConfig, perform RSRP and RSRQ measurements for
     each serving cell, applying for the Pcell the time domain measurement resource
     restriction in accordance with measSubframePatternPCell, if configured;
  1> for each measId included in the measIdList within VarMeasConfig:
    2> if the purpose for the associated reportConfig is set to reportCGI:
       ... ... ...
    2> else
      3> if a measurement gap configuration is setup, or
      3> if the UE does not require measurement gaps to perform the concerned
measurements:
        4> if s-Measure is not configured; or
        4> if s-Measure is configured and the Pcell RSRP, after layer 3 filtering, is
lower than this value:
          5> perform the corresponding measurements of neighbouring cells
on the frequencies and RATs indicated in the concerned measObject, applying for
neighboring cells on the primary frequency the time domain measurement resource
restriction in accordance with measSubframePatternConfigNeigh, if configured in the
concerned measObject;
        4> if the ue-RxTxTimeDiffPeriodical is configured in the associated
reportConfig:
          5> perform the UE Rx-Tx time difference measurements on the
Pcell;
        **4> if the ue-RxTimeDiff-CoordinatingCell is configured in the
associated reportConfig:**
          **5> perform the UE Rx time difference measurements on the
Serving Pcell and the coordinating cell;**
    2> perform the evaluation of reporting criteria as specified in 5.5.4
NOTE 3: The s-Measure defines when the UE is required to perform measurements.
The UE is however allowed to perform measurements also when the Pcell RSRP
exceeds s-Measure, e.g., to measure cells broadcasting a CSG identity following use of
the autonomous search function as defined in TS 36.304[4]

TABLE 8

| ReportConfigEUTRA information element |
|---|

```
-- ASN1START
ReportConfigEUTRA ::=        SEQUENCE {
    triggerType              CHOICE {
        event                SEQUENCE {
            eventId          CHOICE {
                eventA1          SEQUENCE {
                    a1-Threshold     ThresholdEUTRA
                },
                eventA2          SEQUENCE {
                    a2-Threshold     ThresholdEUTRA
                },
                eventA3          SEQUENCE {
                    a3-Offset        INTEGER (-30..30),
                    reportOnLeave       BOOLEAN
                },
                eventA4          SEQUENCE {
                    a4-Threshold     ThresholdEUTRA
                },
                eventA5          SEQUENCE {
                    a5-Threshold1    ThresholdEUTRA,
                    a5-Threshold2    ThresholdEUTRA
                },
                ...,
                eventA6-r10      SEQUENCE {
                    a6-Offset-r10         INTEGER (-30..30),
                    a6-ReportLeave-r10       BOOLEAN
                },
            },
            hysteresis       Hysteresis,
            timeToTrigger    TimeToTrigger
        },
        periodical           SEQUENCE {
            purpose              ENUMERATED {
                                     reportStrongestCells, reportCGI}
        }
    },
    triggerQuantity          ENUMERATED {rsrp, rsrq},
    reportQuantity           ENUMERATED {sameAsTriggerQuantity, both},
    maxReportCells           INTEGER (1..maxCellReport),
    reportInterval           ReportInterval,
    reportAmount             ENUMERATED {r1, r2, r4, r8, r16, r32, r64, infinity},
    ...,
    [[ si-RequestForHO-r9      ENUMERATED {setup} OPTIONAL,-- Cond reportCGI
    ue-RxTxTimeDiffPeriodical-r9   ENUMERATED {setup} OPTIONAL -- Need OR
    ]],
    [[ includeLocationInfo-r10       ENUMERATED {true} OPTIONAL, -- Cond reportMDT
    reportAddNeighMeas-r10        ENUMERATED {setup} OPTIONAL -- Need OR
    ]]
    [[ RequestForSubFrameNoDiff-rxx       ENUMERATED OPTIONAL,
    ue-RxTimeDiff -rxx            ENUMERATED OPTIONAL
    ]]
}
TresholdEUTRA ::=        CHOICE{
    threshold-RSRP       RSRP-Range,
    threshold-RSRQ       RSRQ-Range
}
```

The above may be implemented by any UE. One exemplary device is described below with regard to FIG. 9.

UE 900 is typically a two-way wireless communication device having voice and data communication capabilities. Depending on the exact functionality provided, the UE may be referred to as a data messaging device, a two-way pager, a wireless e-mail device, a cellular telephone with data messaging capabilities, a wireless Internet appliance, a wireless device, a mobile device, or a data communication device, as examples.

Where UE 900 is enabled for two-way communication, it may incorporate a communication subsystem 911, including both a receiver 912 and a transmitter 914, as well as associated components such as one or more antenna elements 916 and 918, local oscillators (LOs) 913, and a processing module such as a digital signal processor (DSP) 920. As will be apparent to those skilled in the field of communications, the particular design of the communication subsystem 911 will be dependent upon the communication network in which the device is intended to operate. The radio frequency front end of communication subsystem 911 can be any of the embodiments described above.

Network access requirements will also vary depending upon the type of network 919. In some networks network access is associated with a subscriber or user of UE 900. A UE may require a removable user identity module (RUIM) or a subscriber identity module (SIM) card in order to operate on a network. The SIM/RUIM interface 944 is normally similar to a card-slot into which a SIM/RUIM card can be inserted and ejected. The SIM/RUIM card can have memory and hold many key configurations 951, and other information 953 such as identification, and subscriber related information.

Figure 9:
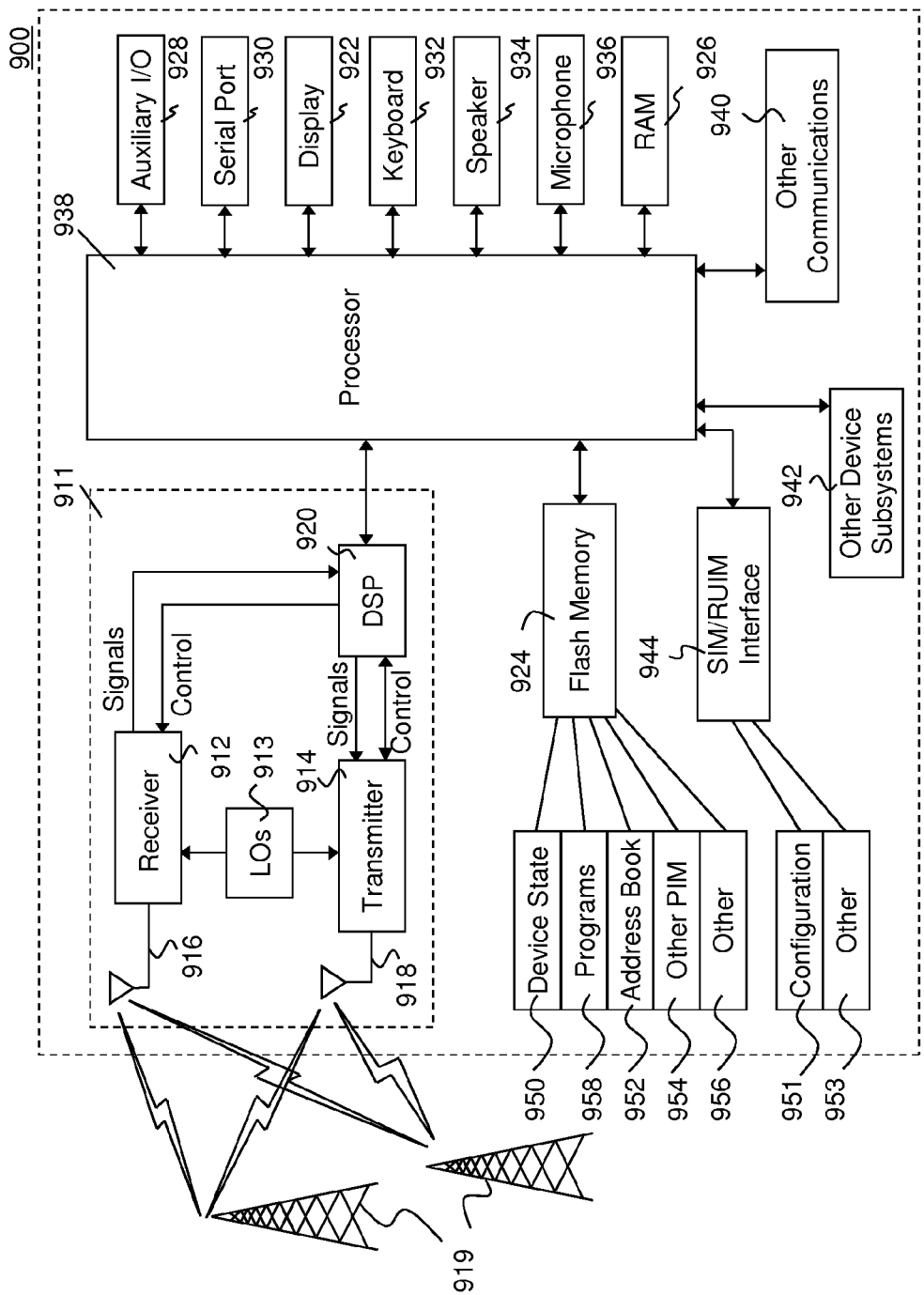
FIG. 9 is a block diagram of an example user equipment.

When required network registration or activation procedures have been completed, UE 900 may send and receive communication signals over the network 919. As illustrated in FIG. 9, network 919 can consist of multiple base stations communicating with the UE.

Signals received by antenna 916 through communication network 919 are input to receiver 912, which may perform such common receiver functions as signal amplification, frequency down conversion, filtering, channel selection and the like. A/D conversion of a received signal allows more complex communication functions such as demodulation and decoding to be performed in the DSP 920. In a similar manner, signals to be transmitted are processed, including modulation and encoding for example, by DSP 920 and input to transmitter 914 for digital to analog conversion, frequency up conversion, filtering, amplification and transmission over the communication network 919 via antenna 918. DSP 920 not only processes communication signals, but also provides for receiver and transmitter control. For example, the gains applied to communication signals in receiver 912 and transmitter 914 may be adaptively controlled through automatic gain control algorithms implemented in DSP 920.

UE 900 generally includes a processor 938 which controls the overall operation of the device. Communication functions, including data and voice communications, are performed through communication subsystem 911. Processor 938 also interacts with further device subsystems such as the display 922, flash memory 924, random access memory (RAM) 926, auxiliary input/output (I/O) subsystems 928, serial port 930, one or more keyboards or keypads 932, speaker 934, microphone 936, other communication subsystem 940 such as a short-range communications subsystem and any other device subsystems generally designated as 942. Serial port 930 could include a USB port or other port known to those in the art.

Some of the subsystems shown in FIG. 9 perform communication-related functions, whereas other subsystems may provide "resident" or on-device functions. Notably, some subsystems, such as keyboard 932 and display 922, for example, may be used for both communication-related functions, such as entering a text message for transmission over a communication network, and device-resident functions such as a calculator or task list.

Operating system software used by the processor 938 may be stored in a persistent store such as flash memory 924, which may instead be a read-only memory (ROM) or similar storage element (not shown). Those skilled in the art will appreciate that the operating system, specific device applications, or parts thereof, may be temporarily loaded into a volatile memory such as RAM 926. Received communication signals may also be stored in RAM 926.

As shown, flash memory 924 can be segregated into different areas for both computer programs 958 and program data storage 950, 952, 954 and 956. These different storage types indicate that each program can allocate a portion of flash memory 924 for their own data storage requirements. Processor 938, in addition to its operating system functions, may enable execution of software applications on the UE. A predetermined set of applications that control basic operations, including at least data and voice communication applications for example, will normally be installed on UE 900 during manufacturing. Other applications could be installed subsequently or dynamically.

Applications and software may be stored on any computer readable storage medium. The computer readable storage medium may be a tangible or in transitory/non-transitory medium such as optical (e.g., CD, DVD, etc.), magnetic (e.g., tape) or other memory known in the art.

One software application may be a personal information manager (PIM) application having the ability to organize and manage data items relating to the user of the UE such as, but not limited to, e-mail, calendar events, voice mails, appointments, and task items. Naturally, one or more memory stores would be available on the UE to facilitate storage of PIM data items. Such PIM application may have the ability to send and receive data items, via the wireless network 919. Further applications may also be loaded onto the UE 900 through the network 919, an auxiliary I/O subsystem 928, serial port 930, short-range communications subsystem 940 or any other suitable subsystem 942, and installed by a user in the RAM 926 or a non-volatile store (not shown) for execution by the processor 938. Such flexibility in application installation increases the functionality of the device and may provide enhanced on-device functions, communication-related functions, or both. For example, secure communication applications may enable electronic commerce functions and other such financial transactions to be performed using the UE 900.

In a data communication mode, a received signal such as a text message or web page download will be processed by the communication subsystem 911 and input to the processor 938, which may further process the received signal for output to the display 922, or alternatively to an auxiliary I/O device 928.

A user of UE 900 may also compose data items such as email messages for example, using the keyboard 932, which may be a complete alphanumeric keyboard or telephone-type keypad, among others, in conjunction with the display 922 and possibly an auxiliary I/O device 928. Such composed items may then be transmitted over a communication network through the communication subsystem 911.

For voice communications, overall operation of UE 900 is similar, except that received signals would typically be output to a speaker 934 and signals for transmission would be generated by a microphone 936. Alternative voice or audio I/O subsystems, such as a voice message recording subsystem, may also be implemented on UE 900. Although voice or audio signal output is generally accomplished primarily through the speaker 934, display 922 may also be used to provide an indication of the identity of a calling party, the duration of a voice call, or other voice call related information for example.

Serial port 930 in FIG. 9 would normally be implemented in a personal digital assistant (PDA)-type UE for which synchronization with a user's desktop computer (not shown) may be desirable, but is an optional device component. Such a port 930 would enable a user to set preferences through an external device or software application and would extend the capabilities of UE 900 by providing for information or software downloads to UE 900 other than through a wireless communication network. The alternate download path may for example be used to load an encryption key onto the device through a direct and thus reliable and trusted connection to thereby enable secure device communication. As will be appreciated by those skilled in the art, serial port 930 can further be used to connect the UE to a computer to act as a modem.

Other communications subsystems 940, such as a short-range communications subsystem, is a further optional component which may provide for communication between UE 900 and different systems or devices, which need not necessarily be similar devices. For example, the subsystem 940 may include an infrared device and associated circuits and components or a Bluetooth™ communication module to provide for communication with similarly enabled systems and devices. Subsystem 940 may further include non-cellular communications such as WiFi or WiMAX.

The above may be implemented by any network element. A simplified network element is shown with regard to FIG. 10. The network element of FIG. 10 shows an architecture which may, for example, be used for the base stations or eNBs described in the embodiments of FIGS. 1 to 8.

In FIG. 10, network element 1010 includes a processor 1020 and a communications subsystem 1030, where the processor 1020 and communications subsystem 1030 cooperate to perform the methods of the embodiments described above.

Processor 1020 is configured to execute programmable logic, which may be stored, along with data, on network element 1010, and shown in the example of FIG. 10 as memory 1040. Memory 1040 can be any tangible storage medium.

Alternatively, or in addition to memory 1040, network element 1010 may access data or programmable logic from an external storage medium, for example through communications subsystem 1030.

Communications subsystem 1030 allows network element 1010 to communicate with other network elements.

Communications between the various elements of network element 1010 may be through an internal bus 1050 in one embodiment. However, other forms of communication are possible.

The embodiments described herein are examples of structures, systems or methods having elements corresponding to elements of the techniques of this application. This written description may enable those skilled in the art to make and use embodiments having alternative elements that likewise correspond to the elements of the techniques of this application. The intended scope of the techniques of this application thus includes other structures, systems or methods that do not differ from the techniques of this application as described herein, and further includes other structures, systems or methods with insubstantial differences from the techniques of this application as described herein.

The invention claimed is:

1. A method for radio resource scheduling for a user equipment ('UE') in a heterogeneous network, comprising:
   receiving at the UE, scheduling parameters including a first value, a second value and a third value;
   listening, at the UE, to a serving cell for a number of consecutive subframes equal to the first value, wherein the first value is n subframes;
   listening, at the UE, to at least one coordinating cell for a number of consecutive subframes equal to the second value, wherein the second value is $N_M$ subframes; and
   transitioning, between the serving cell and the at least one coordinating cell, using a number of subframes equal to the third value, wherein the third value is $N_R$ subframes, and transitioning between the serving cell and the coordinating cells comprises tuning a transceiver of the UE and adjusting transmission power of the UE.

2. The method of claim 1 wherein transitioning between the serving cell and the coordinating cells comprises tuning a transceiver of the UE and adjusting transmission power of the UE.

3. The method of claim 2, wherein the scheduling parameters further include value p, the first value is designated as 'M', the second value is designated as 'L', the third value is designated as 'R', and wherein the UE starts listening to the serving cell at a subframe n, such that $\mod(n, M+L+2R)=p$.

4. The method of claim 1 wherein the scheduling parameters further include a coordinating cell list, the coordinating cell list comprising at least one of a Physical Cell Identifier ('PCI') and carrier frequency for each coordinating cell.

5. The method of claim 1, wherein the scheduling parameters are received from the serving cell.

6. The method of claim 1, further comprising:
   receiving at the UE, during the subframes associated to a first cell, an indication to listen to a second cell;
   listening to the second cell based on the indication.

7. The method of claim 1, further comprising:
   sending from the UE, while listening to a first cell, a request to send an uplink message to a second cell.

8. The method of claim 5, wherein the scheduling parameters are further received from the plurality of coordinating cells.

9. The method of claim 6 wherein the first cell is the serving cell and the second cell is one of the coordinating cells.

10. The method of claim 6 wherein the first cell is one of the coordinating cells and the second cell is the serving cell.

11. The method of claim 6 wherein the first cell is one of the coordinating cells and the second cell is another of the coordinating cells.

12. The method of claim 6, wherein the indication is provided in a Medium Access Control ('MAC') Control Element.

13. The method of claim 6, wherein the indication comprises a value β and wherein the UE starts listening to the second cell after β subframes.

14. The method of claim 7 wherein the first cell is the serving cell and the second cell is one of the coordinating cells.

15. The method of claim 7 wherein the first cell is one of the coordinating cells and the second cell is the serving cell.

16. The method of claim 7 wherein the first cell is one of the coordinating cells and the second cell is another of the coordinating cells.

17. The method of claim 7, wherein the request is provided in a MAC Control Element.

18. The method of claim 13, wherein the indication further comprises a value β1 and wherein the UE listens to the second cell for β1 subframes.

* * * * *